Jan. 23, 1934.　　　　E. J. OCHS　　　　1,944,452
APPARATUS FOR TREATING SLURRY
Filed Dec. 2, 1930
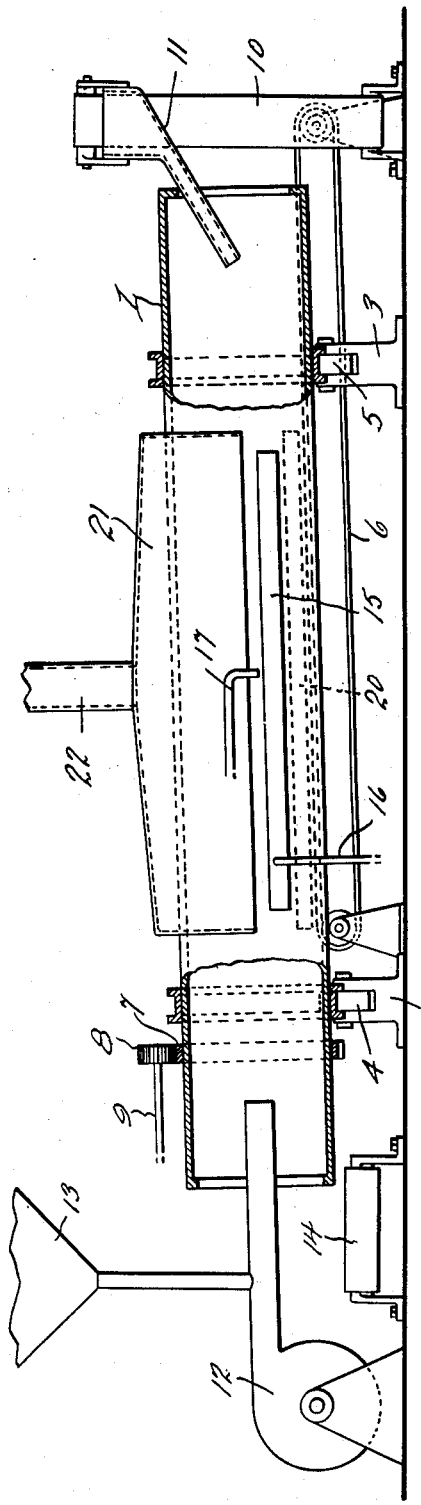
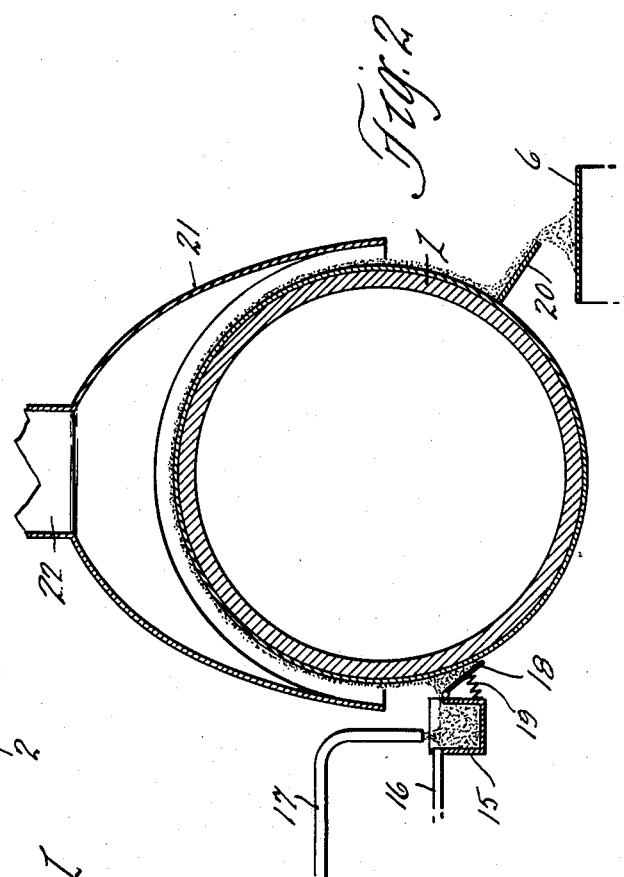
Inventor
Eric J. Ochs
By Hull, Brock & West
Attorney Patented Jan. 23, 1934

1,944,452

UNITED STATES PATENT OFFICE 1,944,452

APPARATUS FOR TREATING SLURRY

Erie J. Ochs, Painesville, Ohio

Application December 2, 1930. Serial No. 499,488

2 Claims. (Cl. 222—7)

This invention relates to a method and apparatus for treating slurry for use in the manufacture of cement.

Portland cement is made from limestone and clay, or limestone and slag, or limestone and cement rock. There are two processes for manufacturing Portland cement one of which is the dry process which dries all of the raw materials before grinding and the other is the wet process which grinds all the raw materials wet, or by adding enough water to these raw materials as they enter the grinding mill in order that the resulting ground material, or slurry, can be pumped to the storage tanks. This slurry is usually held in the storage tanks until such time as it has to be used in the kiln for burning into clinker. A very exact amount of calcium carbonate must be maintained in the slurry. This exact amount is maintained by careful chemical supervision and careful mixing of the slurries to attain the right chemical composition so that the slurry, before it goes into the kilns, has just exactly the right amount of lime. This slurry is usually pumped to the kilns and there burned to clinker. The kilns vary in diameter from 6 to 13 feet and in length from 60 to 330 feet. When the clinker leaves the kilns it is cooled and ground in other grinding mills. At this point gypsum is usually added because the clinker being ground alone will not make a satisfactory cement and the gypsum must be added in order to make it workable. This ground cement is then stored in suitable bins until there is a call for shipment.

In the manufacture of Portland cement by what is known as the "wet process" a certain amount of water must be added to the raw materials so that these raw materials, after being ground, can be pumped. This mixture is generally known as slurry and has a moisture content of from 30 to 60 percent. The water must be removed or evaporated by heat as it passes through the kiln in which this raw material is converted or burned into clinker. Removal of the water is usually accomplished in the kiln which is usually heated by means of powdered coal burned with a mixture of air. It is also old in the art to remove a considerable amount of this moisture from the slurry by use of filters so installed that a part of the water is removed before the material enters the kiln.

One of the main objects of this invention is to provide a method and apparatus for treating slurry which utilizes the heat radiated from the kiln, thus greatly reducing the cost of treating the slurry by utilizing the heat which has heretofore been wasted.

Further and more limited objects of the invention will appear as the description proceeds and by reference to the accompanying drawing in which Fig. 1 is a somewhat diagrammatic view partly in elevation and partly in vertical section disclosing the apparatus for carrying out my method and Fig. 2 is a central vertical sectional view through the apparatus also somewhat diagrammatic.

In carrying out my method, I employ an apparatus which consists essentially of a shell or kiln 1 supported on suitable standards or base members 2 and 3 in each of which is mounted pairs of rollers 4 and 5. The shell or kiln is preferably circular in shape and its length is about twenty-four times its diameter.

Disposed adjacent one side of the kiln 1 and extending longitudinally thereof is an endless conveyor 6 which is driven by any suitable means. Disposed adjacent one end of the kiln and suitably fastened thereto is a ring gear 7 with which meshes a gear 8 connected with a shaft 9 driven by any suitable means. Disposed adjacent the opposite end of the kiln is an endless conveyor 10 onto which the conveyor 6 delivers. The conveyor 10 delivers into a chute or spout 11 which in turn delivers into the end of the kiln. The kiln is heated by means of the standard or usual burner which embodies a blower 12 and a fuel hopper 13. Disposed adjacent this end of the kiln is an endless conveyor 14 which is driven in any suitable manner and serves to remove the material from the kiln. It will be noted that the kiln is disposed at a slight angle so as to feed onto the conveyor 14. Disposed adjacent one side of the kiln and extending longitudinally therealong for a substantial distance is a trough or conduit 15 having an overflow pipe 16. The slurry is delivered into the trough or receptacle 15 through a supply pipe 17. Hingedly secured to one side of the trough 17 is a member 18 which is urged into position as shown in Fig. 2 by means of a spring 19. Disposed on the opposite side of the kiln is a scraper 20 which extends longitudinally of the kiln for a substantial distance and bears against the kiln at one side, as shown in Fig. 2. This scraper may be supported in any suitable manner (not shown). The scraper is disposed so as to deliver onto the conveyor 6. Disposed over the kiln is a shell or cover 21 to collect the steam arising from the drying slurry which is shaped as shown most clearly in Fig. 2 and from which leads a pipe or conduit 22 to carry the steam away from the immediate vicinity of the operators.

The operation of the device is as follows: the slurry is delivered through the pipe 17 into the trough 15 and overflows therefrom onto the member 18 and is spread in a thin film about the outer periphery of the kiln. The excess slurry delivered to the trough 15 may be taken off through the overflow pipe 16. It will, of course, be understood that the kiln is being rotated at the desired speed and maintained at a high temperature by means of the burner. The slurry is spread over the outer periphery of the kiln in a thin film and this film is heated by the heat radiated from the exterior of the kiln. This film is removed from the kiln at the opposite side by means of the scraper 20 which causes the film to be delivered onto the conveyor 6 by which it is conveyed to the conveyor 10 and thence into the chute or spout 11 which delivers into the interior of the kiln. As the kiln is being inclined downwardly toward its delivery end, the material delivered into the conveyor will be fed through the kiln onto the conveyor 14 which delivers the material into a mill or other suitable receptacle for further treatment. The slurry may be sprayed or overflowed or splashed onto one side the kiln, if desired. By delivering the slurry onto the kiln in this manner the heat radiated from the kiln greatly reduces the water content of the slurry which is subsequently delivered into the kiln, thus effecting a great saving of fuel which would otherwise have been necessary to remove this water in the kiln itself. This method of drying slurry is more economical than any previously known method both from the standpoint of cost of installation and operation. The saving in drying slurry by this method will not only be in the reduction of the amount of fuel necessary but the output of the kilns will be greatly increased.

It will now be clear that I have provided a method and apparatus for treating slurries which accomplishes the objects of the invention as hereinbefore stated. It is of course understood that various changes may be made in the method as well as in the apparatus without departing from the spirit of my invention and the embodiment of the invention herein disclosed is merely illustrative and is not to be considered in a limiting sense. My invention is therefore limited only in accordance with the scope of the appended claims.

Having thus described my invention, what I claim is:

1. Mechanism for utilizing waste radiated heat from the calcining kiln for making cement comprising a rotary cylindrical calcining kiln having a portion of its outer surface smooth and free of rivet heads and other obstructions, a slurry box for depositing a coating of slurry on the upwardly moving portion of the rotating kiln, a spring pressed dam hinged to the slurry box and resiliently contacting the rotating kiln, a scraper contacting the smooth portion of the kiln to remove the dried coating of slurry from the kiln, and a conveyor upon which the dried slurry scraped from the kiln falls, for conveying the preliminarily dried slurry to and feeding it into the receiving end of the kiln.

2. Mechanism for utilizing waste radiated heat from the calcining kiln for making cement comprising a rotary cylindrical calcining kiln having a portion of its outer surface smooth and free of rivet heads and other obstructions, a slurry box for depositing a coating of slurry on the upwardly moving portion of the rotating kiln, a spring pressed dam hinged to the slurry box and resiliently contacting the rotating kiln, a cover over approximately the upper half of the smooth portion of the kiln to collect the steam arising from the drying coating of slurry, a pipe leading from the cover to convey the collected steam away from the proximity of the operators, a scraper disposed below the edge of the cover and contacting the smooth portion of the kiln to remove the dried coating of slurry from the kiln, and a conveyor upon which the dried slurry scraped from the kiln falls, for conveying the preliminarily dried slurry to and feeding it into the receiving end of the kiln.

ERIE J. OCHS.